United States Patent [19]
Howell et al.

[11] Patent Number: 4,699,484
[45] Date of Patent: Oct. 13, 1987

[54] RAIL MOUNTED CAMERA SYSTEM

[76] Inventors: Mary E. Howell, 20911 Beachwood La., Huntington Beach, Calif. 92646; Michael A. Hofstein, 15200 Delgado Dr., Sherman Oaks, Calif. 91403; Murrell D. Howell, 20911 Beachwood La., Huntington Beach, Calif. 92646

[21] Appl. No.: 887,045
[22] PCT Filed: Nov. 15, 1985
[86] PCT No.: PCT/US85/02261
§ 371 Date: May 27, 1986
§ 102(e) Date: May 27, 1986
[87] PCT Pub. No.: WO87/03104
PCT Pub. Date: May 21, 1987
[51] Int. Cl.⁴ .................... G03B 17/00; G03B 21/00
[52] U.S. Cl. .................... 352/243; 352/132; 354/293
[58] Field of Search ............ 352/132, 243; 354/81, 354/293

[56] References Cited
U.S. PATENT DOCUMENTS

| | | | |
|---|---|---|---|
| 1,602,499 | 10/1926 | Meinecke | 352/132 |
| 2,348,841 | 5/1944 | Oswald | 352/132 |
| 2,633,054 | 3/1953 | Black | 354/293 |
| 2,677,305 | 5/1954 | Oswald | 352/132 |
| 2,842,026 | 7/1958 | Reese et al. | 354/293 |
| 3,164,838 | 1/1965 | Heinrich | 354/293 |
| 3,353,776 | 11/1967 | Clemens | 354/293 |
| 3,603,545 | 9/1971 | Boniface | 354/293 |
| 3,613,546 | 10/1971 | Richardson | 352/243 |
| 3,688,676 | 9/1972 | Cruickshank | 354/81 |
| 4,398,469 | 8/1983 | Zelli | 354/293 |

Primary Examiner—Monroe H. Hayes
Attorney, Agent, or Firm—Albert O. Cota

[57] ABSTRACT

A camera system which has a wheeled rail car (20) with running gear (26) front and back connected to a chassis (40) containing a movable panning head (46) on the top, covered by an enclosure (44). The panning head (46) has a motion picture camera (58) mounted thereon and the rail car (20) is self-propelled and the head (46) rotatability tilts up and down and pans 360 degrees. The car (20) is movably installed on a track system (22) consisting of rails (64) connected together with ties (78), each rail (64) having a power strip (66) supplying electrical energy to the car (20) through a set of wipers (84). An electrical control system (24) is positioned remotely from the tracks (22) and provides control for propulsion and positioning of the panning head (46), as well as control of the camera (58). A television monitor (86) receives a signal from the camera (58), allowing the operator visual indication of the scene viewed by the camera. The entire system may be stationary or mounted on an engine driven vehicle with the operator controlling the system from the inside.

2 Claims, 12 Drawing Figures

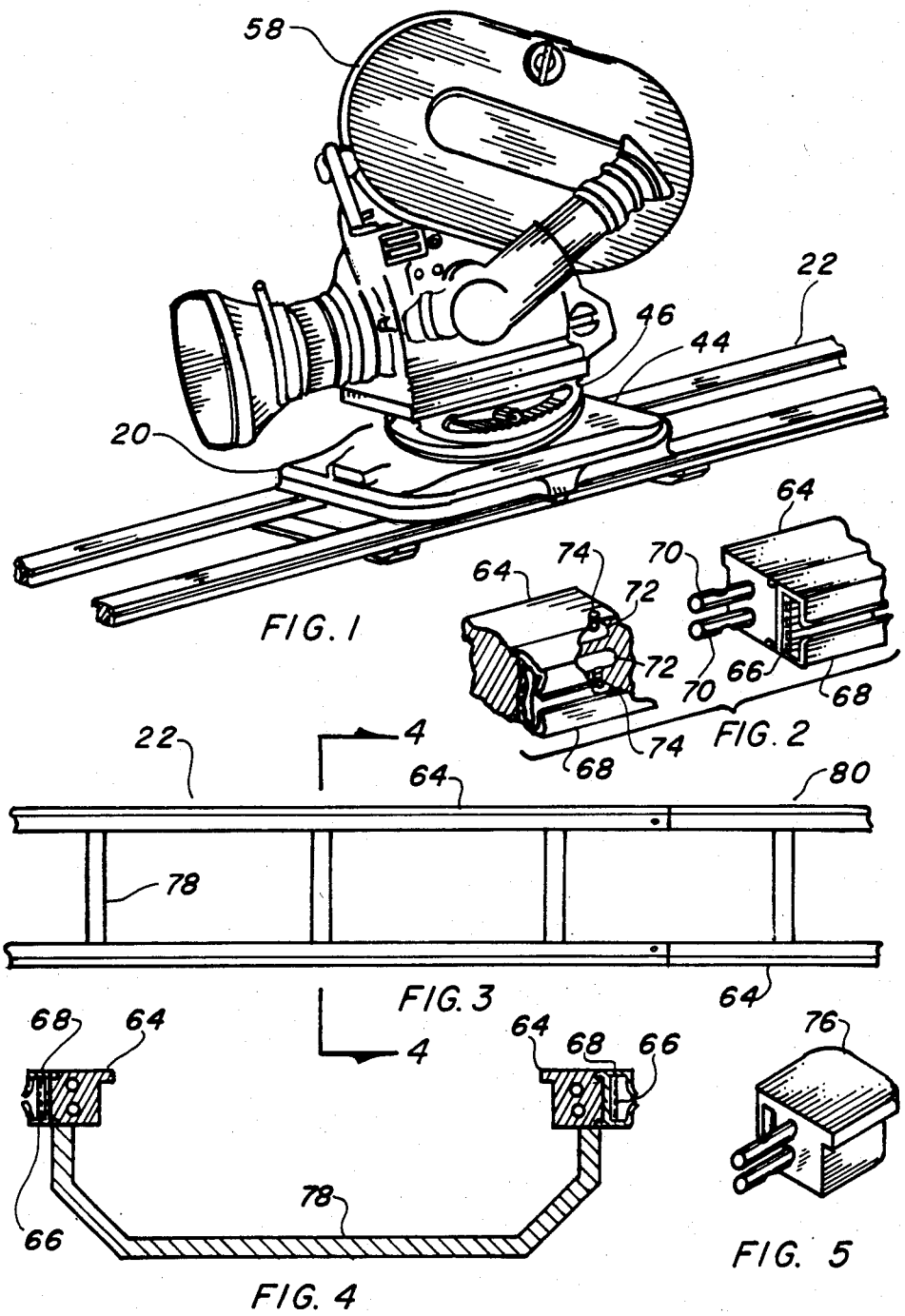

U.S. Patent  Oct. 13, 1987  Sheet 4 of 4  4,699,484
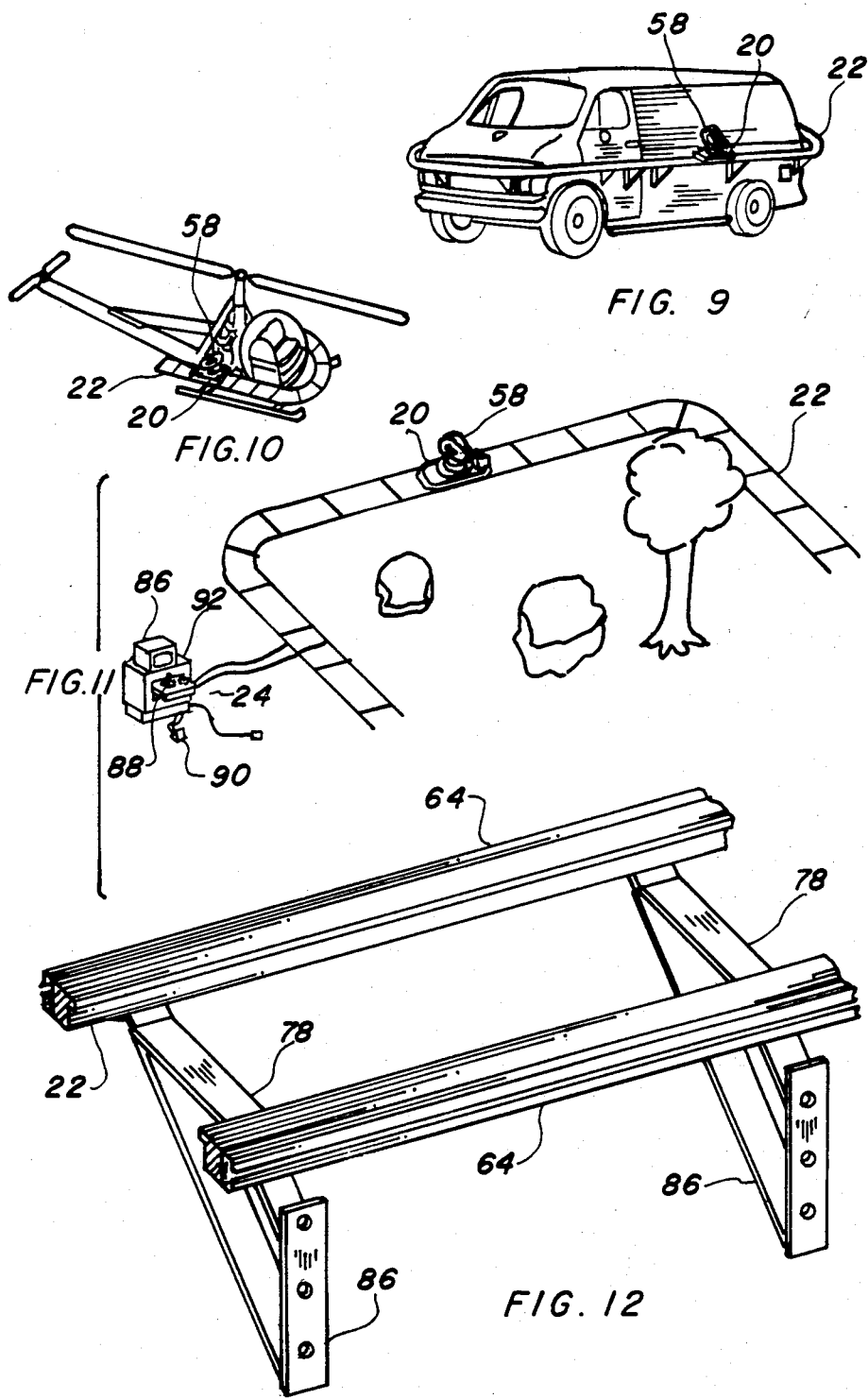

RAIL MOUNTED CAMERA SYSTEM

TECHNICAL FIELD

The present invention relates to camera positioning devices in general, and more specifically to a self-propelled rail mounted camera system positioned on a flat surface or mounted on a vehicle with the system controlled from a remote source.

BACKGROUND ART

Previously, many types of camera systems have been developed to traverse a given scene, either mounted on a fixed surface, or on a moving vehicle. Many and varied approaches have been made to accomplish this procedure, self-propelled camera dollies that have hoists and pivots have been utilized. Stationary tracks have been employed to minimize the movement of the camera. A search of the prior art did not disclose any patents that read directly on the claims of the instant invention, however, the following U. S. patents were considered related:

| U.S. Pat. No. | Inventor | Issue Date |
|---|---|---|
| 4,236,795 | Kephart | Dec. 2, 1980 |
| 4,174,162 | Giacomini et al | Nov. 13, 1979 |
| 4,052,712 | Ohama et al | Oct. 4, 1977 |
| 3,688,676 | Cruickshank | Sep. 5, 1972 |
| 3,643,345 | Wilton et al | Feb. 22, 1972 |
| 3,613,546 | Richardson | Oct. 19, 1971 |

Kephant teaches a stationary platform with a turntable mounted relative to the platform for rotation about an axis aligned with the scene in the center. A camera is mounted on a vertical post and rotates around the scene in a fixed orientation.

Giacomini et al utilizes a camera mounted on an aircraft with a control rod connected at one end to a camera leading into the aircraft to manually adjust the system from the interior.

Ohama et al discloses a projecting light beam and a camera mounted on a vehicle such that the camera is at a predetermined angular position in relation to the light projector. A detecting device serves to operate the projector and camera synchronously.

Cruickshank employs an assembly that takes a series of photographs at a preselected angular and longitudinal positions. The structure includes a partially circular guide with a trolly carrying camera and light projector transported on wheels on guide members.

Wilton et al utilizes an articulating arm mounted camera over a case where a model is horizontally positioned. The entire assembly is stationary and mounted upon a pedestal base with the camera moving radially inward by a motor driven system using rack and pinion gears.

Finally, Richardson uses a camera traversing structure improving a camera dolly by the inclusion of a curved camera support track permitting the camera to slideably move along the entire length of the track.

It will be noted that the prior art cited does not teach a combination of tracks being capable of mounting into a vehicle nor a remote controlled system of any type.

DISCLOSURE OF THE INVENTION

With the advent of technologically advanced motion picture cameras that are self-contained and have the capability of remote control, such as controlled lens zoom, on and off operation, controlled focus and remote monitoring of the image through a television signal, the need now arises for a system that will take advantage of these expanded capabilities. It is, therefore, a primary object of the invention to provide a self-propelled rail car that is completely self-adjusting for the camera and has mobility forward and reverse and the capability to pan right and left and tilt up and down, all controlled from a remote location.

An important object of the invention, not only allows control from a remote location, but may be operated from the inside of a vehicle while moving with the system completely housed therein. The actual scene being filmed may be monitored inside the vehicle with the closed circuit television monitor providing the visual indication for the operator.

Another object of the invention uses its own rails to provide a level surface for the camera to operate upon. These rails are separable into sections for installation on a flat surface, such as a sound stage or outside on the ground for field operations. Further, these rails may be mounted onto any vehicle, such as a van, truck, or automobile, or an aircraft, either fixed wing, or rotary blade. Also, an air cushion vehicle or boat may have the rails mounted thereon. Not only do the rails provide a flat, smooth surface, but the rail car may be operated in any angular plane from horizontal to upside down, as the wheels contact both top and bottom surfaces of the rail. The rail may be mounted with suitable brackets on just one side of the vehicle and move back and forth within the limits provided, or it may completely surround the vehicle on all sides, or any limitation therebetween. Since the monitoring may be accomplished inside the moving vehicle, wind velocity and other detrimental effects may be completely ignored while filming in adverse environmental conditions.

Still another object of the invention permits the rail car to move along the tracks with no electrical cables attached directly to the car. This feature allows the car to make a complete revolution around the supporting vehicle, or if the tracks are placed in a circle to continue operation endlessly allowing flexibility heretofore not available in this type of filming system. The electrical power is transmitted to the rail car through a series of busses integrally positioned within the rail that provide the power for electrical motors on the car. A wiper is in continuous contact with each circuit maintaining contact regardless of the position of the car.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 1 is a partial isometric view of the rail car installed upon a partial section of rail.

FIG. 2 is a fragmentary exploded view of the rails where they attached together.

FIG. 3 is a plan view of a section of rails.

FIG. 4 is a cross-sectional view taken along lines 4—4 of FIG. 1.

FIG. 5 is a partial isometric view of the end cap as it fits into the end of a rail for protection.

FIG. 9 is a partial isometric view of a van with surrounding rails.

FIG. 10 is a partial isometric view of a helicopter with surrounding rails.

FIG. 11 is a partial isometric view of the preferred embodiment illustrated mounted outside on the ground on location.

FIG. 12 is a partial isometric view of the rails mounted to a bracket, as installed on a vehicle.

BEST MODE FOR CARRYING OUT THE INVENTION

Figure 6:
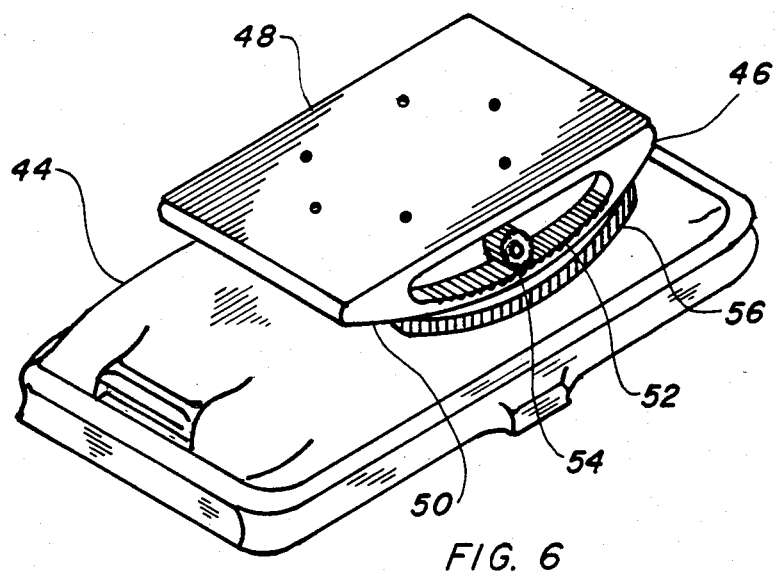
FIG. 6 is a partial isometric view of the enclosure completely removed from the rail car for clarity.

The best mode for carrying out the invention is presented in terms of a preferred embodiment, which is illustrated in a complete system in FIG. 11. This system is comprised basically of a rail car 20, a track system 22, and an electrical control system 24.

The rail car 20 consists of wheeled running gear 26 oriented in such a manner as to operate in a right side up or upside down position. A pair of top wheels 28 are connected rotatably on each end to an axle 32, and likewise a pair of bottom wheels 30 are attached to a separate axle 32. Each pair of wheeled axles 32 are pivotally connected in the center forming a set of trucks. These axles are individually and resiliently connected to a set of coil springs 34 to provide a cushion effect for the rail car 20. A pair of horizontal guide wheels 36 are spaced apart on a guide bracket 38 adjacent to the top and bottom wheels 28 and 30 completing the truck assembly.

A chassis 40 is connected to the running gear 26 on each end and forms a structural frame capable of supporting a camera when stationary or when placed in motion. The axles 32 pivot onto this chassis, both front and rear, allowing the trucks to move in unison on each end, also the guide wheels 36 and guide bracket 38 are attached to the chassis 40 and pivot in a similar manner as the axles 32 on both ends. This arrangement utilizes 4 guide wheels 36 on the front and 4 on the back for a total of 8 wheels. These wheels 36 are horizontally positioned 90 degrees from the top and bottom wheels 28 and 30 and act to retain alignment on the side and assure smooth operation. The chassis is constructed of suitable structured material, such as sheetmetal formed into shapes, structural angles, channels, tees, etc., of either ferrous material, aluminum, magnesium, or thermoplastics. Connection of the members is by any usual method known in the art, such as welding, riveting, or attachment with threaded fasteners.

Propulsion means to actuate the rail car 20 in a forward and reverse direction by supplying the motivational force to rotate the wheels 28 and 30 is provided by a plurality of electric motors 42. These motors 42 have gearboxes for speed reduction and are attached to gears on the axles 32, both front and back. Together the motors 42 propel the rail car 20 at any speed desired within limitations of the gearbox and gear ratio, however, 12 inches (30.5 centimeters) per second is usually optimum.

An enclosure 44 is disposed removably upon the chassis 40 and covers the running gear 26 and motors 42. This enclosure 44 becomes a body to conceal and protect operating personnel from the wheels 28 and 30 and gears attached to the motors 42 and other moving parts thereunder. Along with this safety protection, a pleasing asthetic, cosmetic effect is realized as the enclosure 44 contains smooth contour lines, not unlike that of an automobile. This enclosure 44 may be of any suitable material, such as wood, metal, etc., with a plastic-like fiberglass being preferred. Removal of this enclosure 44 is made easy by the use of threaded, or quarter turn, fasteners attached directly through to the chassis 40.

Figure 7:
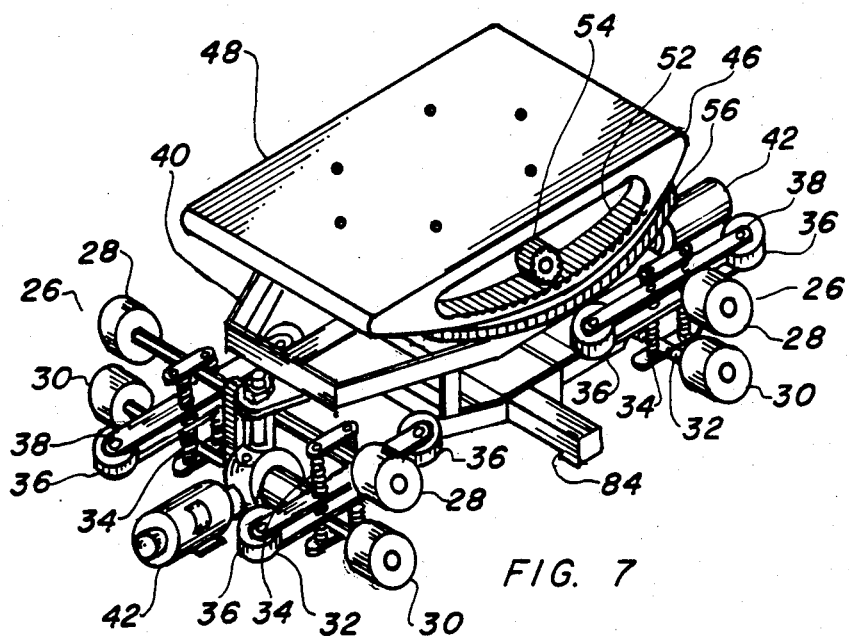
FIG. 7 is a partial isometric view of the chassis, running gear, and propulsion means of the rail car completely removed from the invention for clarity.
Figure 8:
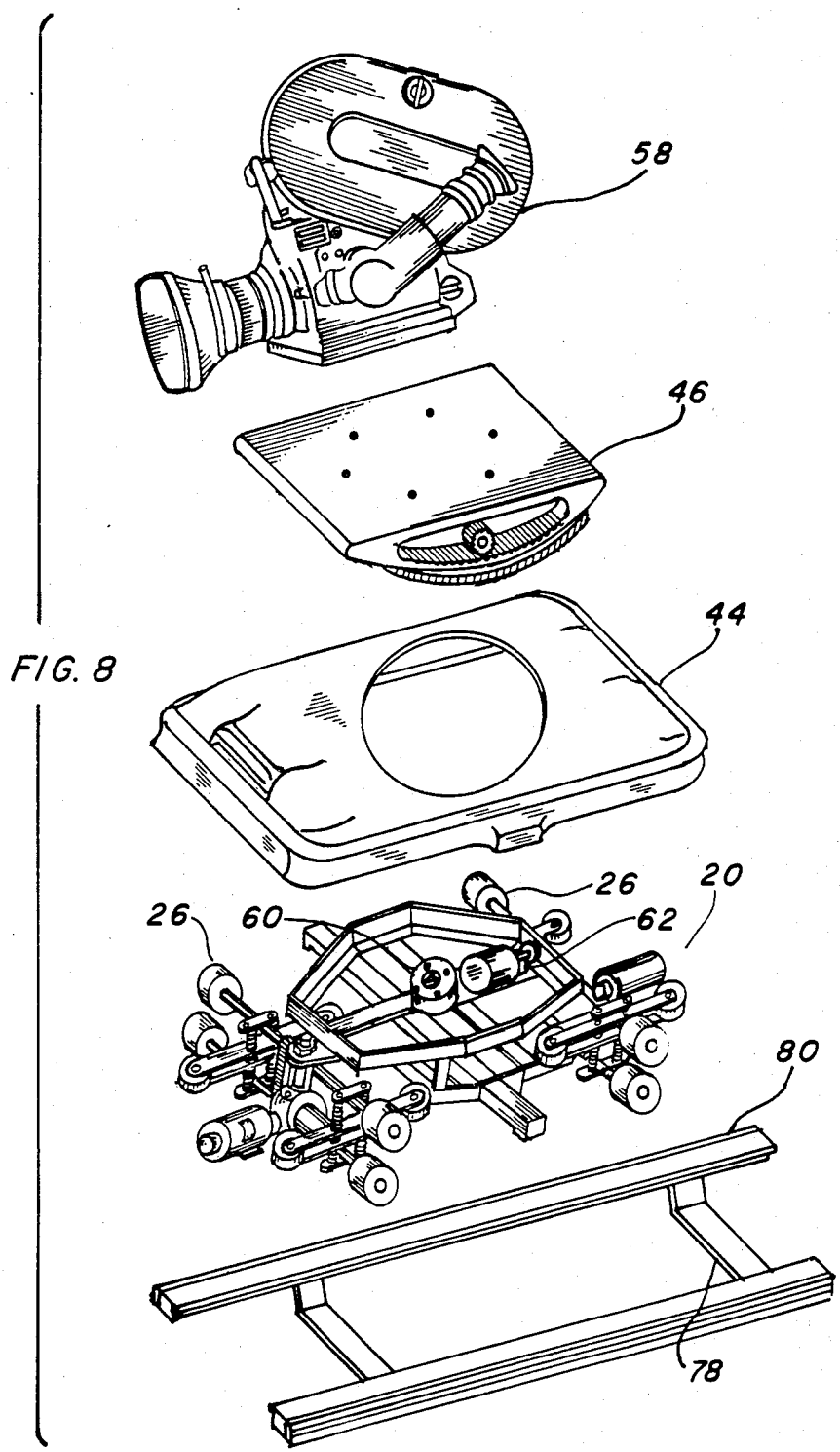
FIG. 8 is an exploded partial isometric view of the rail car with the camera completely removed from the system for clarity.

A movable panning head 46 is rotatably connected to the chassis 40 and is capable of supporting the weight of a motion picture camera while providing movement in a radial tilt up and down position and a simultaneous axial pan direction. This head 46 consists of a table 48 with conventional mounting means for a camera having axial sides 50 with rack gears 52 on the inside of each side 50. The configuration is much like that of a rocking chair, allowing the sides 50 to move freely within an arc, tilting the table 48 as it rotates. A pinion gear 54 is intermeshed with each rack gear 52, best illustrated in FIG. 7, actuating the rotational movement of the head 46. The movement may be any angle up to 90 degrees, however, a minimum of 30 degrees above and below the horizontal plane is deemed optional. The head 46 is further mounted on a radial driven gear 56 allowing complete rotation about a horizontal plane of 360 degrees. This movement allows complete unrestricted panning of a camera 58 mounted on the head 46.

The camera 58 is a conventional motion picture or television camera that has the capability of being monitored remotely with a television receiver and be adjusted electromechanically for focus and lens zoom.

The panning head 46 is rotated by controls from a remote location by a head elevating motor 60, having a gearbox for speed reduction and a shaft interfacing with each pinion gear 54. Likewise, the head 46 is rotated by a head rotating motor 62, having a gearbox and a gear intermeshing with the radial driven gear 56 beneath the head 46. These two motors 60 and 62 work independently, however, both tilt and pan may be accomplished simultaneously when controlled in such a manner.

As such, the rail car 20 is completely self-contained and is capable of movement and direction of the panning head 46 having its own motors and apparatus without direct attachment to any wires, cables, or mechanical connections. The only interface needed is a directional guidance system and controlled power.

The track system 22 supplies such guidance and power and utilizes a pair of rails 64 configured to correspond and interface with the wheeled running gear 26. Since there are wheels 28 and 30 that operate both on top of and underneath the rails 64, there is a wheel compatible surface opposed on each side. To conduct electrical power to the rail car 20 a plurality of electrically conducting thermoplastic dielectrically insulated power strips 66 are attached to the outside surface of the rail 64. This arrangement also includes an insulated cover 68 on the outside, leaving only a small opening for entrance to the electrically conducting strips 66. The cover 68 is attached to the rail 64 using a tongue and groove configuration allowing the cover 68 to be snapped into place and retained by the resiliency of the thermoplastic dielectric material itself. The power strips 66, as shown best in FIG. 2, may consist of either continuous overlapping electrical strips that overlap where the rails are attached or a set of electrically conducting busses that interface by means of male and corresponding female connectors. The connector interface is made at each rail end. Thus, the electrical circuit may continue when a number of rails are attached together. A pair of aligning pins 70, also depicted in FIG. 2, provide the mechanical connecting means for each rail 64. The pins 70 penetrate into mating sockets 72 in the adjoining rail 64 having spring loaded ball detents 74 to hold the rails together when thus joined. This rail 64 is constructed of any metal, such as steel, or magnesium, with satin chrome finished aluminum being preferred.

The terminating point of the rail 64 is provided with a male or female cover 76 that interfaces with either the pins 70 or sockets 72 and also includes covering the conducting power strip 66. This cover 76 provides protection from mechanical damage to the exposed end and encloses the electrically conducting busses for safety of the operating personnel and accidental grounding from impingement of foreign matter when the rail 64 is used on location.

In order to attach the rails 64 together, a plurality of ties 78 are utilized. These ties 78 connect to the rails 64 at a point on the outside beyond the interface with the wheels 28 and 80 and before the power strip 66. This connection point allows the wheels to move freely upon the rail and the tie 78 is formed in a channel shape with the web on the bottom and the legs directed upward. This shape allows the bottom wheel to be unobstructed. FIG. 4 best illustrates the configuration. The ties 78 are attached at predetermined spacing forming a track 80 with two opposed rails 76 making the assembly rigid and capable of being handled and connected together as an assembly. Any spacing may be used for the ties 78, however, it has been found that a track section 80 approximately 6 feet (1.83 meters) long with ties 78 every 2 feet (0.61 meters) is optimum for convenience of handling and assembly. The track 80 may also be curved with a 15 inch (37.5 centimeter) radius a practical minimum.

For attachment to an engine driven vehicle, such as a van, truck, car, or an aircraft, either fixed wing or rotary blade, or a boat, or a ground effect machine, a plurality of brackets 82 may be added to the track 80. These mounting brackets 82 attach directly to the ties 78 of the track 80, as shown in FIG. 12, and are preferably triangular in shape, however, any form or shape may be substituted for irregular surfaces on the vehicle. These brackets 82 allow the system to be portable and selfcontained, either on one side, or completely around the vehicle with the ultimate flexibility being offered.

Electrical power means provides a path for an electrical circuit to be completed to the propulsion, rotational and elevational systems from a remote location. This allows the rail car to move freely upon the track 80 and angularly position the camera 58 and provide panning capabilities. This is accomplished using a plurality of wipers 84 attached to the chassis 40 interfacing and sliding upon the power strip 66 of the rail 64. This method of transferring power allows a non-interrupted circuit to flow to the motors 42, 60 and 62 and camera 58 while the rail car is moving along the track 80. A power distributing system within the rail car utilizes insulated electrical wire, junction boxes, terminal strips, etc., well known in the art.

Remote control and monitoring means for the system provide communication with an operator away from the scene at a remote location. This is accomplished by the use of a television monitor 86 that receives modulated signals from the camera 58 through an integral antenna to review the scene being filmed. Other devices include a joy stick 88 controller switch that actuates the rotational and elevational direction of the camera 58 mounted on the panning head 46, and individual switches regulate the focus and zoom of the lens to completely control the direction and operation of the camera 58. A pair of foot pedals 90 control and regulate the direction and speed of the propulsion means for the rail car 20 along the track system 22. Finally, a console 92 is used containing the requisite peripheral electronic equipment to actuate this above described remote control and monitoring means, along with the power distribution relays, transformers, inverters, connectors, receptacles, circuit breakers, etc., necessary for control functions.

The rail mounted camera system is assembled by attaching the track 80 together, either in a straight line, or curved, to follow a particular contour, or even in a circle, as required by the situation. This procedure is for an indoor sound stage, building, or outside on location. The track 80 is then connected with the necessary cable to the console 92 and an outside power source. The controls 88 and 90 and the television monitor 86 are attached electrically to the console 92 and are positioned in a remote location. FIG. 11 illustrates such an arrangement. The rail car 20 is mounted on the track system 22 with the camera 58 in place on the panning head 46 and the power is energized. The operator then has complete control of the filming, as the rail car 20 moves along the track 80 with the zoom, focus, pan, and elevation easily controlled applying the visual indication of the television monitor at all times.

For filming in a dynamic situation where movement of the entire system is required, the same procedure is followed, except the track system 22 is installed on a vehicle with the requisite brackets 82 rigidly mounted thereupon. The control system 24 is mounted within the vehicle and the power is supplied by a portable generator, or the like, not part of this invention. The rail car 20, along with the camera 58, is installed on track 80. The operator then controls the system, as previously described, from the inside of the vehicle. It will be noted that the wheels 28 and 30 interface with the rails 64 on both the top and the bottom, retaining the rail car 20 in any attitude, even upside down, and the drive system will continue to function in the normal manner. This allows the use of the system on vehicles, such as airplanes and helicopters, where unconventional positions, such as this, are commonly encountered.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

We claim:
1. A self-propelled rail car and self-positioning camera system for filming motion pictures comprising:
 (a) rail car wheeled running gear having a plurality of resilient wheels positioned in such a manner as to operate in a right side up and upside down orientation;
 (b) a rail car chassis connected to a running gear on each end forming a structural frame capable of supporting a camera while placed in motion with said running gear;

(c) rail car propulsion means drivingly connected to said running gear and said chassis to actuate the rail car in a forward and reverse direction by supplying motivational force to rotate said wheels;

(d) an enclosure disposed above and attached to said rail car chassis, covering the running gear and propulsion means providing a body to conceal the same and protect operating personnel from open moving components thereunder, also providing a pleasing asthetic, cosmetic effect for the system;

(e) a movable panning head rotatably connected to said chassis to support the weight of a camera and provide movement thereupon in a radial tilt up and down position, also simultaneous axial pan direction;

(f) a motion picture camera attached upon said panning head for filming scenes;

(g) means to rotate and elevate said panning head controlled from a remote location providing directional movement of the camera mounted upon said platform while the rail car is moving from one location to another;

(h) a pair of rails in plural sections to support and supply power to said apparatus configured to correspond and interface with said wheeled running gear giving body and guidance to the system;

(i) a plurality of ties connecting said rails together at predetermined spacing forming a track the same width as said running gear providing a rigid base thereunto;

(j) a plurality of mounting brackets attached to said rails for interfacing with an engine driven vehicle, such as a truck, allowing said system to be portable;

(k) electrical power means providing a path for an electrical circuit to be completed to said propulsion, rotation, and elevational means from a remote location allowing the above rail car to move freely upon said rails and angularly position said camera; and, (1) remote control and monitoring means for said system providing communication with an operator away from the scene at a remote location, said system characterized by positioning a motion picture camera upon said panning head that is, in turn, movably connected to the chassis containing running gear, which is covered by the enclosure, the above assembly self-propelled upon a set of power providing rails connected by ties and mounting brackets with remote control and monitoring means providing the direction and visual indication of the camera.

2. A self-propelled rail car and self-positioning camera system for filming motion pictures comprising:

(a) a rail car having wheeled running gear and propulsion mean further comprising:

(1) a plurality of top wheels allowing alignment and contiguous engagement with a pair of rails for supporting the weight of said rail car, (2) a plurality of bottom wheels allowing alignment with the underside of a pair of rails for supporting the weight of said rail car when turned upside down, (3) a plurality of horizontal guide wheels adjacent to said top and bottom wheels allowing contiguous engagement with a pair of rails for maintaining said rail car between a pair of rails, (4) a plurality of axles rotatably connected on each end to each plurality of wheels, also pivotally mounted to said rail car for transmitting the weight to a pair of rails, (5) a plurality of coil springs resiliently mounted between said axles and said rail car providing a cushion effect therewith, (6) a plurality of electric motors having gearboxes and gears rotatably attached to said wheeled running gear for propulsion thereof, (b) a movable panning head rotatably connected to said rail car to support the weight of a camera and provide movement thereupon in a radial tilt up and down position, also simultaneous axial pan directions, said movable panning head having, (1) a table with attaching means for a camera on the top thereof, (2) axial sides having rack-like gears on the inside of each side capable of angular movement, (3) a pinion gear intermeshed with each rack gear for moving the table of the panning head in a radial angular position at least 30 degrees from above and below a horizontal plane, (4) a radial driven gear for rotating said head at least 360 degrees about the horizontal plane for panning a camera, (c) a motion picture camera attached upon said panning head for filming scenes, (d) means to rotate and elevate said panning head controlled from a remote location providing directional movement of the camera mounted upon said panning head while the rail car is moving from one location to another wherein said means to rotate and elevate said panning head further comprises a head elevating motor having a gearbox and shaft attached rotatably with each pinion gear and a head rotating motor having a gearbox and drive gear intermeshing with said radial driven gear providing the electromotive force to rotate said panning head in a radial tilt and axial pan direction, (e) a pair of rails in plural sections to support and supply power to said rail car configured to correspond and interface with said wheeled running gear giving support and guidance to the system, wherein said rails further comprise a wheel compatible surface on the top and an opposed wheel compatible surface on the bottom and a plurality of electrically conducting dielectrically insulated power strips on the outside surface thereof having an insulated cover on the outside for interfacing with the running gear and supplying power to the rail car, also a plurality of pins on one end of the rail and mating sockets on the other for mechanical connection therebetween when attached together to extend the length of said rail, each rail having male and female covers on the end thereof interfacing with said pins and sockets to terminate the open ends of said rails and provide a safety cover to protect the exposed end of said rail, (f) electrical power means providing a path for an electrical circuit to be completed to said propulsion, rotation, and elevational means from a remote location allowing the above rail car to move freely upon said rails and angularly position said camera, said power means having a plurality of wipers interfacing into said rails for transferring electrical power from the rails to the system while the rail car is moving along the rails and power distribution means to transfer said power to the rotational and propulsion means thereof; and, (g) remote control and monitoring means for said system providing communication with an operator away from the scene at a remote location, further comprising:

(1) a television monitor recieving signals from said camera to review the scene being filmed, (2) a joystick control switch to activate the rotational and elevational means of said camera mounted on said panning head for remote control thereof, (3) a pair of foot controls to regulate the direction and speed of the propulsion means for remote control thereof, (4) a console having the required electronic equipment to actuate the remote control and monitoring means, as described, said system characterized by positioning a motion picture camera upon said panning head that is, in turn, movably connected to the chassis containing running gear, with the rail car self-propelled upon a set of power providing rails connected by ties and mounting brackets with remote control and monitoring means providing the direction and visual indication of the camera.

* * * * *